No. 628,854. Patented July 11, 1899.
W. W. ROBINSON.
CUCUMBER PICKER.
(Application filed Jan. 6, 1899.)
(No Model.)
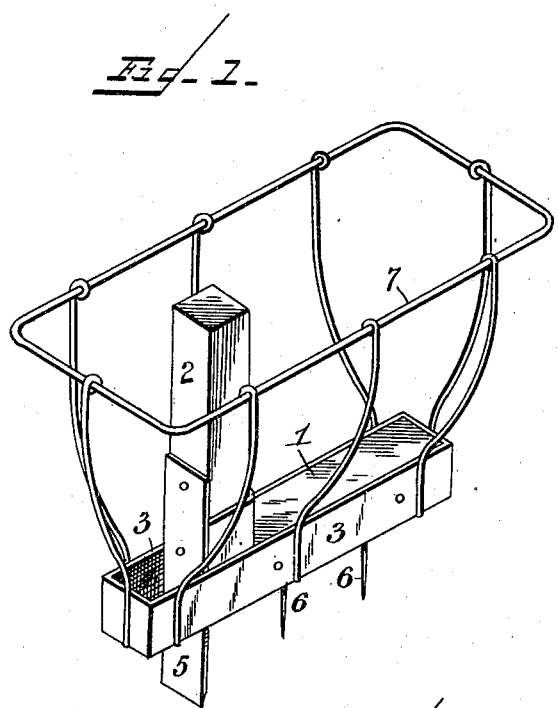
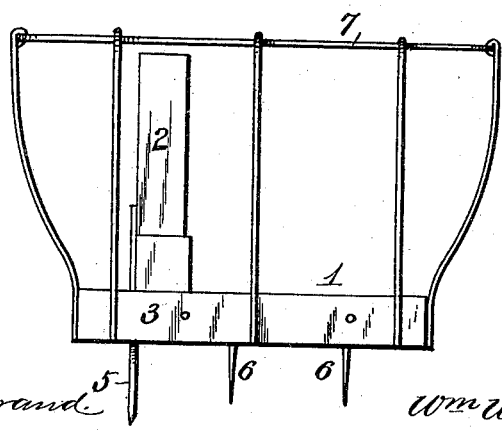
WITNESSES:
Franck L. Ourand
Jos. L. Coombs
INVENTOR:
Wm. W. Robinson,
BY
Louis Bagger & Co.,
ATTORNEYS.
THE NORRIS PETERS CO., PHOTO-LITHO., WASHINGTON, D. C.

UNITED STATES PATENT OFFICE.

WILLIAM W. ROBINSON, OF RIPON, WISCONSIN.

CUCUMBER-PICKER.

SPECIFICATION forming part of Letters Patent No. 628,854, dated July 11, 1899.

Application filed January 6, 1899. Serial No. 701,357. (No model.)

*To all whom it may concern:*

Be it known that I, WILLIAM W. ROBINSON, a citizen of the United States, residing at Ripon, in the county of Fond du Lac and State of Wisconsin, have invented new and useful Improvements in Cucumber-Pickers, of which the following is a specification.

My invention relates to cucumber pickers or gatherers; and its object is to provide an improved device by which cucumbers may be severed from the vines and lifted from the ground in a rapid and efficient manner and without the labor and fatigue incident to the ordinary manner of picking them by hand.

The invention consists in the novel construction and combination of parts hereinafter fully described and claimed.

In the accompanying drawings, Figure 1 is a perspective view of a cucumber-picker constructed in accordance with my invention. Fig. 2 is a side elevation of the same.

In the said drawings the reference-numeral 1 designates a horizontal bar, to which is secured a handle 2, by which the device is operated. Secured to the upper and lower sides of said bar are plates 3, which project beyond the ends thereof and the ends of which are connected together, forming a space 4 between said ends and the end of the bar. Secured to said handle is a knife 5, which projects in front of the said bar and serves to sever the cucumbers from the vines. Also secured to said bar are downwardly-projecting pins 6, which are adapted to engage with the severed cucumbers and by which they may be lifted from the ground.

The numeral 7 designates a wire frame secured to or connected with said plates 3 for the purpose of preventing the device being clogged by vines or weeds.

In using the device the operator pushes the knife down, so that it will engage with the stem of the cucumber and sever it from the vine. At the same time the pins will enter the cucumber, and thus enable it to be lifted after being severed, as set forth.

Having thus fully described my invention, what I claim is—

1. In a cucumber-picker, the combination with the horizontal bar, the plates secured thereto, the handle secured to said bar and the knife secured to the lower end thereof, of the pins secured to said bar, substantially as described.

2. In a cucumber-picker, the combination with the horizontal bar, the plates secured thereto, the handle secured to said bar, the knife at the lower end of said handle and the pins secured to said bar, of the wire frame secured to said plates, substantially as described.

In testimony whereof I have hereunto set my hand in presence of two subscribing witnesses.

WILLIAM W. ROBINSON.

Witnesses:
W. R. LYLE,
A. R. SOPER.